Patented Dec. 27, 1932

1,892,536

UNITED STATES PATENT OFFICE

PHILIP B. MYERS AND GEORGE L. BAKER, OF NEWARK, DELAWARE; DEDICATED, BY MESNE ASSIGNMENTS, TO THE PEOPLE OF THE UNITED STATES OF AMERICA

PROCESS OF EXTRACTING PECTIN FROM PECTIC MATERIALS

No Drawing.   Application filed December 21, 1929. Serial No. 415,877.

(GRANTED UNDER THE ACT OF MARCH 3, 1883, AS AMENDED APRIL 30, 1928; 370 O. G. 757)

This application is made under the act approved April 30, 1928, and the invention herein described, if patented, may be manufactured and used by or for the Government for governmental purposes without payment to us of any royalty thereon.

This invention relates to a process for extracting pectin from pectic materials. By pectic materials we mean any fruit or vegetable such as oranges, lemons, grape fruit, apples, quinces, grapes, carrots, sugar beets, etc., that contain an appreciable amount of pectin. Now the pectin in unripe fruits and vegetables is found in the water-insoluble compound protopectin, a compound resulting from the combination of pectin and cellulose. As the fruit or vegetable ripens there is a gradual breaking down of the protopectin, liberating the pectin in a water-extractable form. This is attributed to enzymatic action. However, this type of decomposition or hydrolysis is not confined to the protopectin alone as certain enzymes also attack the liberated pectin converting it into the worthless, insoluble compound, petic acid. Therefore it is not wise to let nature hydrolyze the protopectin since it also destroys the pectin.

Protopectin may be broken up in several ways, namely; by hydrolysis with an alkali which results in the worthless pectic acid; by hydrolysis simply by heating with water, which is very inefficient and results in low yields; by hydrolysis with acids; by enzymatic action, previously mentioned. The acid hydrolysis of the protopectin is the only one of commercial value, since it is possible by this process to quickly split off the pectin from the protopectin and at the same time minimize the destructive hydrolytic action on the pectin itself.

Our process consists in so regulating the conditions of the acid hydrolysis that the pectin resulting therefrom will contain more jelly units than pectins extracted under any other conditions. By jelly units we mean the figure obtained by multiplying together the yield of pectin (expressed in percent pectin recovered from a pectic material) and the jelly grade of the pectin (expressed in parts of sugar necessary to add to one part of pectin to result in a jelly of constant strength). For instance suppose 600 lb. of pectin were obtained from 2000 lb. of pectin material. The yield would then be 30%. Then suppose it necessary to add 350 lb. of sugar to each lb. of the pectin in order to produce a jelly of constant strength, 50 for example. The jelly grade of the pectin would be 350 and the jelly units would be 0.30 times 350 or 105. Thus the term jelly units takes into consideration the yield and jellying power of the pectin and since the quantity of jelly obtained is proportional to the amount of sugar added, the term jelly units is a measure of the quantity of jelly that may be made from the pectin extracted from a given weight of pectic material under certain conditions of extraction.

It is therefore quite evident that the extraction process yielding the highest number of jelly units would be the most favorable. We have therefore studied the effects of various conditions of extraction upon the yield and jelly grade of the resulting pectin and have arrived at certain definite conclusions which are the basis of these specifications.

We have found that:

1. The time of heating, at any temperature, with or without pressure, a pectic material with water or water containing any acid, mineral or organic, has an influence on the yield of pectin and on the jelly grade of the pectin. In general the longer the period of heating, the higher the yield and the lower the jelly grade of the pectin.

2. The higher the temperature at which the extraction is performed, other conditions remaining constant, the higher the yield and the lower the jelly grade of the pectin and vice versa so that the product of the yield and jelly grade of the resulting pectins is approximately a constant within the temperature limits of approximately 60–110° C. This is true only if the extraction is performed under the optimum conditions later specified.

3. That the yield of pectin from a pectic material increases as the hydrogen ion concentration of the extracting medium is increased by the addition of any acid, reaching an optimum value when the hydrogen ion concentration of the extracting medium is at a pH of approximately 2.0—1.5 depending upon the nature of the acid used. Good yields may be obtained by regulating the hydrogen ion concentration of the extracting medium between the pH limits of 3.0—0.5.

4. That the jelly grade of the pectin, extracted from a pectic material, increases as the hydrogen ion concentration of the extracting medium is increased by the addition of any acid, reaching an optimum value when the hydrogen ion concentration of the extracting medium is at a pH of approximately 2.40.

5. That the jelly units of a pectin vary with the hydrogen ion concentration of the extracting medium reaching an optimum value when the pH of the extracting medium is approximately 2.15 regardless of the amount and nature of the acid used in adjusting the hydrogen ion concentration of the extracting medium to a pH of 2.15. However, it is possible to obtain a pectin of fairly high jelly units when it is extracted between the pH limits of 3.0—1.0.

6. That a pectin of high jelly units is obtained when extracted by heating the pectic material with water containing sufficient acid to adjust the hydrogen ion concentration of the extracting medium within the limits of pH of 3.0—1.0, and heating during the extraction from 5-60 minutes. The time of heating during the extraction depends somewhat upon the temperature at which the extraction is performed. Extracting at temperatures of 80° C. and above a pectin of maximum jelly units is obtained when the extraction is carried out approximately thirty minutes. At temperatures below 80° C. it probably will require a longer extraction period to reach the optimum value.

In the practice of the invention we prefer to proceed with the extraction as follows:—

Sufficient water is run into the extraction apparatus so that the ratio of dry pectic material to water will be as 1:60. Acid, preferably hydrochloric or tartaric, is then added to the water in quantities sufficient to adjust the reaction of the mix, after the extraction is completed, to a pH between the limits 3.0—1.0, preferably 2.15. The acid solution is then heated, preferably to the boiling point and the right amount of pectic material, previously ground is then added to the solution. The heating is then continued at the chosen temperature, for approximately thirty minutes. The mix is then cooled as quickly as possible to prevent decomposition of the liberated pectin and the residue separated from the solution by filtration. The addition of filter cel to the mix will aid the filtration. The pectin is then recovered from the solution by any of the known methods, i. e. by precipitation with alcohol, aluminum chloride or sulphate, etc.

We claim:

1. The process of extracting pectin from pectic material which comprises heating a mixture of water, acid and said pectic material to any temperature between the limits of 60° C. and 110° C., the acid being present in an amount such that after the extraction process the pH of the mixture lies between 3.0 and 1.30.

2. The process of extracting pectin from pectic material which comprises heating a mixture of water, acid and said pectic material to any temperature between the limits of 60° C. and 110° C., for a period of time ranging from 5 to 60 minutes, the acid being present in an amount such that after the extraction process the pH of the mixture lies between 3.0 and 1.30.

3. The process of extracting pectin from pectic material which comprises heating a mixture of water, acid and said pectic material to any temperature between the limits of 60° C. and 110° C., for a period of time ranging from 5 to 60 minutes, and then quickly cooling the mixture, the acid being present in an amount such that after the extraction process the pH of the mixture lies between 3.0 and 1.30.

4. The process of extracting pectin from pectic material which comprises boiling a mixture of water, acid and said pectic material for 30 minutes and then quickly cooling the mixture, the acid being present in an amount such that after the extraction process the pH of the mixture will be 2.15.

PHILIP B. MYERS.
GEORGE L. BAKER.